(12) United States Patent
Ranger et al.

(10) Patent No.: US 11,579,864 B1
(45) Date of Patent: Feb. 14, 2023

(54) ACCELERATED BEHAVIOR CHANGE FOR UPGRADES IN DISTRIBUTED SYSTEMS

(71) Applicant: EMC IP Holding Company LLC, Hopkinton, MA (US)

(72) Inventors: Mark Ranger, Seattle, WA (US); Gene W. Lee, Seattle, WA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 16 days.

(21) Appl. No.: 17/479,375

(22) Filed: Sep. 20, 2021

(51) Int. Cl.
*G06F 8/65* (2018.01)
*G06F 9/4401* (2018.01)

(52) U.S. Cl.
CPC .............. *G06F 8/65* (2013.01); *G06F 9/4401* (2013.01)

(58) Field of Classification Search
CPC ........................................................ G06F 8/65
See application file for complete search history.

(56) References Cited

U.S. PATENT DOCUMENTS

| | | | |
|---|---|---|---|
| 2013/0276113 A1* | 10/2013 | Dalcher | G06F 11/00 726/23 |
| 2016/0034508 A1* | 2/2016 | Aron | G06F 16/2246 707/626 |
| 2017/0052779 A1* | 2/2017 | Yu | G06F 8/656 |
| 2021/0406130 A1* | 12/2021 | Jorapur | G06F 8/65 |

* cited by examiner

*Primary Examiner* — Jae U Jeon
(74) *Attorney, Agent, or Firm* — Amin, Turocy & Watson, LLP (57) ABSTRACT

Accelerated behavior change for upgrades in a distributed system is described herein. A method as described herein can include facilitating a file system upgrade of a first computing node of a computing cluster from a first file system version to a second file system version that is newer than the first file system version, wherein the file system upgrade comprises pre-restart operations and a system restart performed subsequent to the pre-restart operations; activating a supervisor system of the first computing node in response to the first computing node completing the file system upgrade; and causing, in response to the activating, the supervisor system of the first computing node to initiate concurrent performance of the pre-restart operations of the file system upgrade at second computing nodes of the computing cluster, distinct from the first computing node.

20 Claims, 10 Drawing Sheets

| Upgrade step \ Node index | 1 | 2 | 3 | 4 |
|---|---|---|---|---|
| 1 | X | | | |
| 2 | X | | | |
| Reboot | X | | | |
| Post-reboot | X | | | |

FIG. 7

| Upgrade step \ Node index | 1 | 2 | 3 | 4 |
|---|---|---|---|---|
| 1 | X | X | X | X |
| 2 | X | X | X | X |
| Reboot | X | | | |
| Post-reboot | X | | | |

|  | Node index | | | |
|---|---|---|---|---|
| Upgrade step | 1 | 2 | 3 | 4 |
| 1 | X | X | X | X |
| 2 | X | X | X | X |
| Reboot | X | X | | |
| Post-reboot | X | | | |

|  | Node index | | | |
|---|---|---|---|---|
| Upgrade step | 1 | 2 | 3 | 4 |
| 1 | X | X | X | X |
| 2 | X | X | X | X |
| Reboot | X | X | X | |
| Post-reboot | X | X | | |

ACCELERATED BEHAVIOR CHANGE FOR UPGRADES IN DISTRIBUTED SYSTEMS

BACKGROUND

Software updates in a distributed computing system, such as file system or operating system update, can be performed as a rolling upgrade in which respective nodes of the distributed system are upgraded one at a time in sequence. A rolling upgrade can be desirable, for example, to minimize the number of nodes of the distributed system that are unavailable due to upgrades at any given time. Due to the rotating unavailability of system nodes during a rolling upgrade, operations associated with the upgrade can be coordinated via a supervisor system that is initiated at various nodes of the system over the course of the rolling upgrade process, e.g., such that the functionality of the supervisor system is moved from node to node during the rolling upgrade.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a data storage system is described herein. The data storage system can include a memory that stores executable components and a processor that executes the executable components stored in the memory. The executable components can include an upgrade initialization component that causes a first computing node in the data storage system to perform a file system upgrade from a first file system version to a second file system version that is newer than the first file system version. The file system upgrade can include pre-reboot operations and a system reboot performed subsequent to the pre-reboot operations. The executable components can further include an upgrade coordination component that activates an upgrade coordinator system of the first computing node in response to the first computing node completing the file system upgrade. The executable components can additionally include an accelerated upgrade component that, in response to the upgrade coordination component activating the upgrade coordinator system of the first computing node, causes the upgrade coordinator system of the first computing node to instruct second computing nodes of the data storage system, distinct from the first computing node, to perform the pre-reboot operations of the file system upgrade concurrently.

In another implementation, a method is described herein. The method can include facilitating, by a system operatively coupled to a processor, a file system upgrade of a first computing node of a computing cluster from a first file system version to a second file system version that is newer than the first file system version, where the file system upgrade includes pre-restart operations and a system restart performed subsequent to the pre-restart operations. The method can also include activating, by the system, a supervisor system of the first computing node in response to the first computing node completing the file system upgrade. The method can further include causing, by the system in response to the activating, the supervisor system of the first computing node to initiate concurrent performance of the pre-restart operations of the file system upgrade at second computing nodes of the computing cluster, distinct from the first computing node.

In an additional implementation, a non-transitory machine-readable medium including computer executable instructions is described herein. The instructions, when executed by a processor of a data storage system, can facilitate performance of operations including facilitating a file system update for a first computing node of a computing system from a first file system version to a second file system version that is newer than the first file system version, where the file system update comprises pre-reboot operations and a reboot operation performed subsequent to the pre-reboot operations; activating a coordinator system of the first computing node in response to the first computing node completing the file system update; and, in response to the activating, causing the coordinator system of the first computing node to initiate concurrent performance of the pre-reboot operations of the file system update at second computing nodes of the computing system that are distinct from the first computing node.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Figure 1:
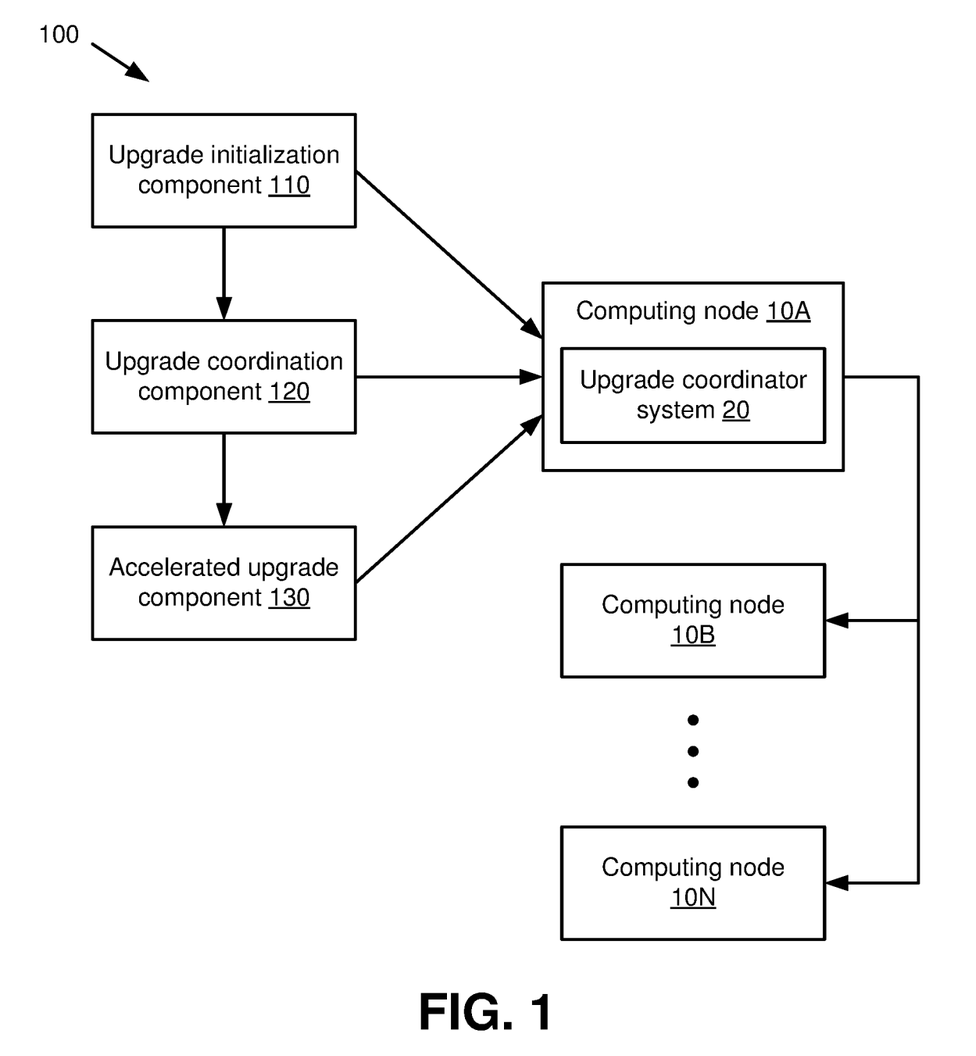
FIG. 1 is a block diagram of a system that facilitates accelerated behavior change for upgrades in distributed systems in accordance with various implementations described herein.

With reference now to the drawings, FIG. 1 illustrates a block diagram of a system 100 that facilitates accelerated behavior change for upgrades in distributed systems in accordance with various implementations described herein. As shown in FIG. 1, system 100 includes an upgrade initialization component 110, an upgrade coordination component 120, and an accelerated upgrade component 130, which can operate as described in further detail below. In an implementation, the components 110, 120, 130 of system 100 can be implemented in hardware, software, or a combination of hardware and software. By way of example, the components 110, 120, 130 can be implemented as computer-executable components, e.g., components stored on a memory and executed by a processor. An example of a computer architecture including a processor and a memory that can be used to implement the components 110, 120, 130, as well as other components as will be described herein, is shown and described in further detail below with respect to FIG. 12.

As further shown in FIG. 1, the components 110, 120, 130 of system 100 can interact with respective computing nodes 10 of a distributed computing system, here N nodes 10A-10N. While the computing nodes 10 shown in FIG. 1 are labeled sequentially, e.g., 10A, 10B, etc., it is noted that the naming convention used for the computing nodes 10 is not intended to imply a specific number of computing nodes associated with system 100. Instead, it is noted that system 100 can be associated with any suitable number of computing nodes 10, including two computing nodes and/or more computing nodes. Additionally, while the computing nodes 10 shown in system 100 are logically distinct and are illustrated as distinct entities, it is noted that the respective computing nodes 10 need not be physically distinct. For instance, some or all of the computing nodes 10 associated with system 100 could be housed by a common physical chassis and/or other apparatus despite being logically separate system nodes. Alternatively, respective ones of the computing nodes 10 could be located in different physical devices.

In an implementation, the components 110, 120, 130 can be implemented at one or more of the computing nodes 10 of system 100. For instance, the components 110, 120, 130 can be implemented, wholly or in part, by an upgrade coordinator system 20 running on one or more of the computing nodes 10. The upgrade coordinator system 20 and its functionality are described in further detail below. Also or alternatively, the components 110, 120, 130 can be implemented via one or more computing devices that are separate from the computing nodes 10 and communicate with the computing nodes 10 via any suitable wired or wireless communication technology. Other implementations of the components 110, 120, 130 are also possible.

In an implementation as shown by FIG. 1, the respective computing nodes 10 of system 100 can communicate with each other over a backend network associated with system 100 and/or any other suitable interconnection between the respective computing nodes 10. Additionally, communications between the computing nodes 10 of system 100 can be conducted via a data transport protocol, e.g., the Transmission Control Protocol (TCP), User Datagram Protocol (UDP), or the like. Other techniques for facilitating communication between the computing nodes 10 of system 100 could also be used.

Inter-node communications between the computing nodes 10 of system 100, e.g., as described above, can be used to facilitate rolling upgrade functionality for the respective computing nodes 10 of system 100. In general, a rolling upgrade enables respective nodes of a distributed computing system to be upgraded sequentially, e.g., such that only one node, or a defined number of nodes, is unavailable due to system upgrade operations (e.g., a system reboot and/or other event(s) that render a node unavailable for processing client requests) at a time. In an implementation, the number of nodes that can be unavailable at a given time can be chosen based on a data storage and/or redundancy scheme utilized by system 100, e.g., such that a sufficient number of nodes remain available at all times to prevent loss of access to data stored by system 100.

In the example shown by FIG. 1, rolling upgrades can utilize a framework in which an upgrade coordinator system 20 (also referred to as a supervisor or supervisor system, coordinator system, etc.) runs on one of the computing nodes 10, here computing node 10A, to coordinate the upgrade across each of the computing nodes 10. Since computing nodes 10 participating in a rolling upgrade become unavailable at different times during the upgrade process (e.g., due to system restarts or the like), the functionality of the upgrade coordinator system 20 can be moved between respective ones of the computing nodes 10 as appropriate. In an implementation, a computing node 10 on which the upgrade coordinator system 20 is active can coordinate all upgrade operations on all associated computing nodes 10, e.g., until the functionality of the upgrade coordinator system is moved to another computing node 10. The functionality of the upgrade coordinator system 20 can be passed between the computing nodes 10 in any suitable manner, e.g., based on a set of logic-based rules, random or pseudorandom selection, round robin rotation, etc.

The components 110, 120, 130 of system 100 as described herein can facilitate improved rolling upgrade functionality, e.g., by parallelizing upgrade operations across nodes where appropriate. For instance, a rolling upgrade without parallelization can function by completing all steps of the upgrade process on a given node before starting any steps of the upgrade process on another node. An example algorithm that can be used for a rolling upgrade without parallelization is as follows:

1. Run upgrade checks on all nodes
2. Start upgrade process on node 1
3. Wait until node 1 has rebooted and finished upgrading
4. Start upgrade process on node 2
5. Wait until node 2 has rebooted and finished upgrading
6. Repeat steps 3-5 on applicable nodes In the above example, the upgrade process is driven by the behavior from the version from which the software of the respective nodes is being upgraded, i.e., the low-side version of the upgrade. Thus, if the version to which the software of the respective nodes is being upgraded, i.e., the high-side version of the upgrade, contains enhancements that would enable acceleration of the upgrade, the upgrade would not utilize those enhancements due to the process being driven by the low-side version of the upgrade.

In an implementation, system 100 can structure a file system and/or other software or firmware components of the respective computing nodes 10 to enable rollback between versions, e.g., as desired by a system operator or administrator. As a result, respective system versions can be configured to be compatible with other versions of the same system, e.g., to enable nodes that can potentially run different system versions to function together regardless of the version differences. Accordingly, the components 110, 120, 130 of system 100 can leverage this version compatibility to accelerate node behavior changes during a rolling upgrade by enabling a node that has upgraded and rebooted into a high-side version to run optimizations to the upgrade process present in the high-side version. By way of example, the components 110, 120, 130 can operate as described below to enable an upgrade coordinator system 20 running on an upgraded node to start the upgrade process on multiple other system nodes, e.g., all other system nodes, up to the reboot step, thereby bypassing the wait times present in steps 3 and 5 of the above process.

With reference now to the components 110, 120, 130 of system 100, the upgrade initialization component 110 of system 100 can cause a first computing node 10A of system 100 to perform a system upgrade, e.g., an upgrade of a file system, operating system, or other software components of node 10A from a first version to a second version that is newer than the first version. In an implementation, a system upgrade performed at node 10A as initialized by the upgrade initialization component 110 can include one or more upgrade-related operations as well as a system reboot. As used herein, the term "pre-reboot operations" refers to system upgrade operations performed by a computing node prior to a system reboot, while the term "post-reboot operations" refers to system upgrade operations performed by a computing node subsequent to a system reboot. In the event that a given system upgrade is associated with multiple reboot steps, the upgrade can conceptually be divided into multiple upgrade stages that each include a single system reboot without departing from the subject matter described herein.

The upgrade coordination component 120 of system 100 can activate an upgrade coordinator system 20, also referred to as a supervisor or supervisor system, of the first computing node 10A in response to the first computing node 10A completing the system upgrade initiated by the upgrade initialization component 110. While the upgrade coordination component 120 can activate the upgrade coordinator system 20 of computing node 10A in response to computing node 10A completing the system upgrade, it is noted that activation of the upgrade coordinator system 20 by the upgrade coordination component 120 can occur indirectly, e.g., instead of the upgrade coordinator system 20 of computing node 10A being activated as a direct result of computing node 10A finishing the system upgrade. For instance, the upgrade coordination component 120 of system 100 can activate the upgrade coordinator system 20 of computing node 10A according to one or more techniques for rotating coordinator functionality between respective ones of the computing nodes 10 as described above.

In response to the upgrade coordination component 120 activating the upgrade coordinator system 20 of the first computing node 10A, the accelerated upgrade component 130 of system 100 can cause the upgrade coordinator system 20 of the first computing node 10A to instruct other computing nodes of system 100, e.g., computing nodes 10B-10N as shown in FIG. 1, to perform the pre-reboot operations of the file system upgrade concurrently, e.g., at substantially the same time.

Figure 2:
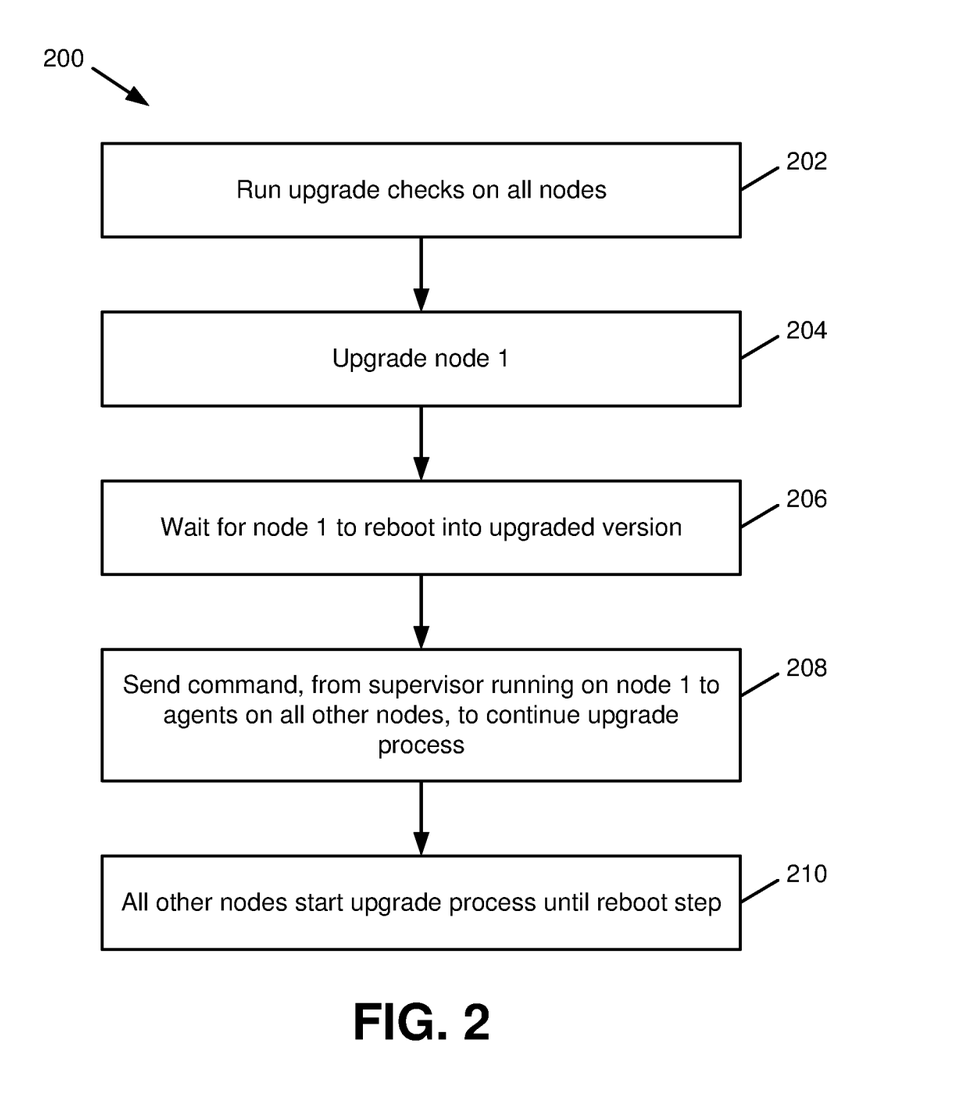
FIG. 2 is a flow diagram of an example method that can be performed by the system of FIG. 1 in accordance with various implementations described herein.
Figure 3:
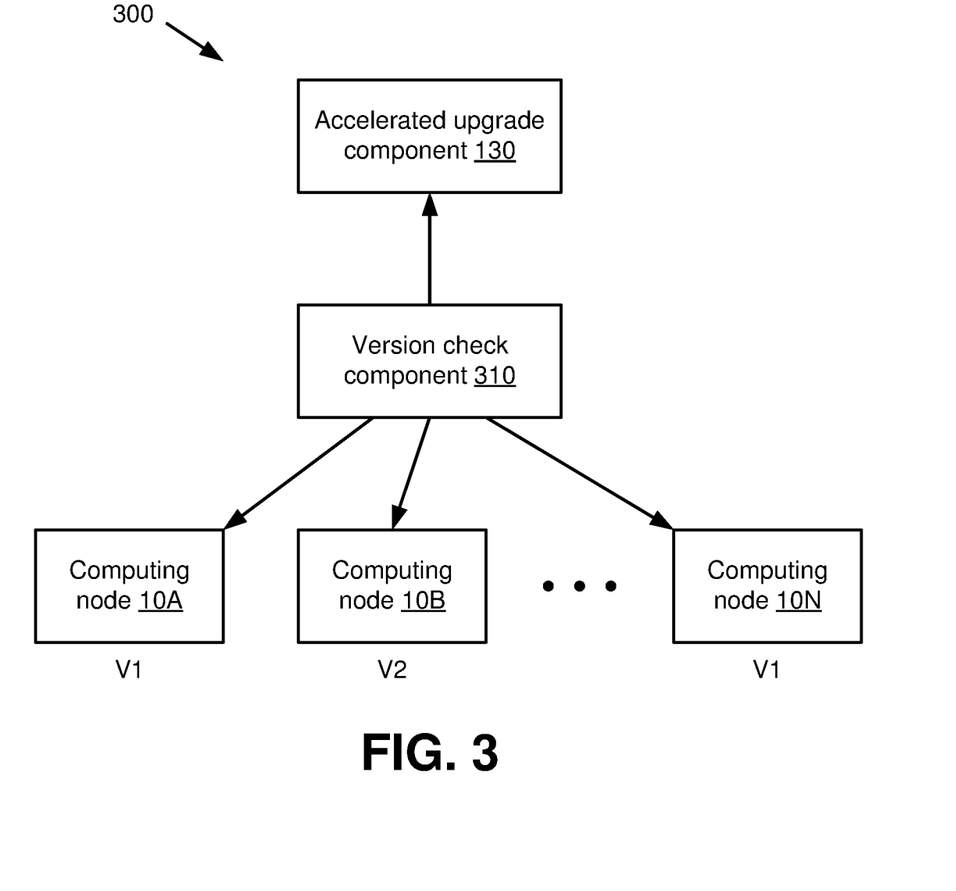
FIG. 3 is a block diagram of a system that facilitates update checks for respective nodes of a distributed computing system in connection with a rolling upgrade in accordance with various implementations described herein.
Figure 4:
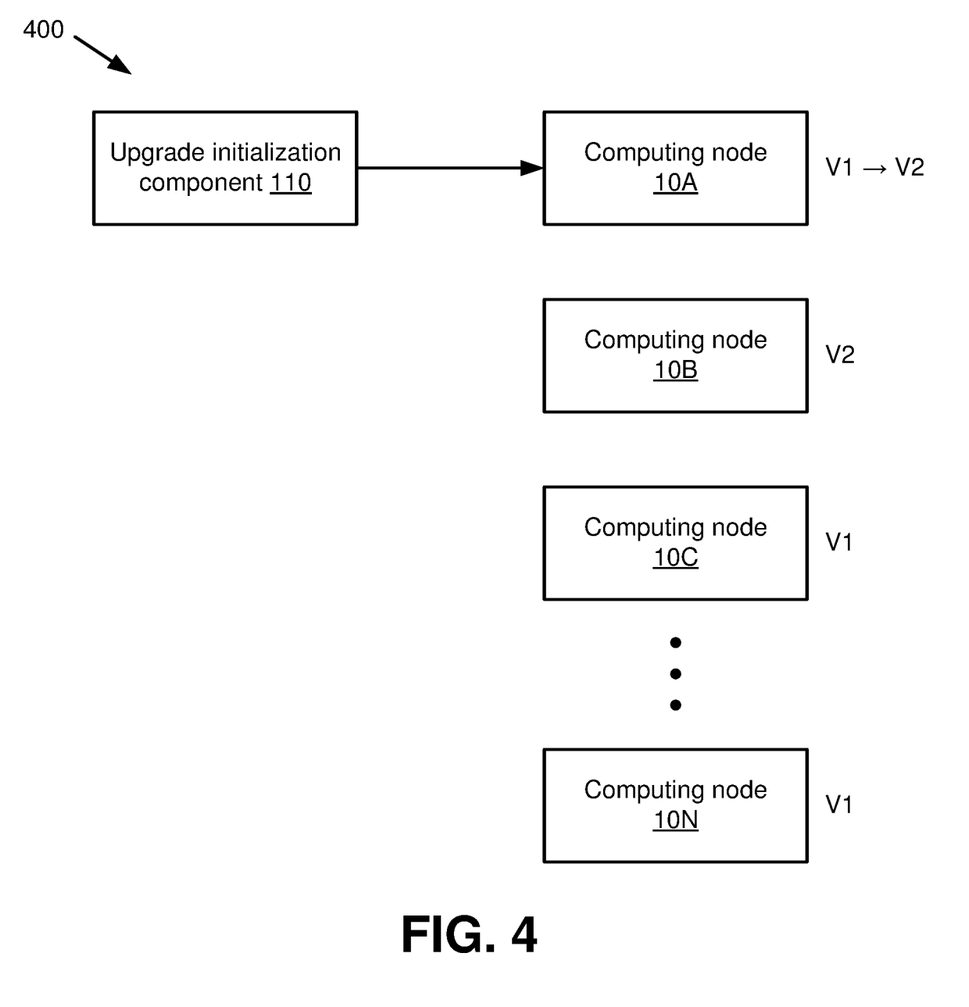
FIGS. 4-5 are block diagrams of respective systems that facilitate upgrading nodes of a distributed computing system in connection with a rolling upgrade in accordance with various implementations described herein.
Figure 5:
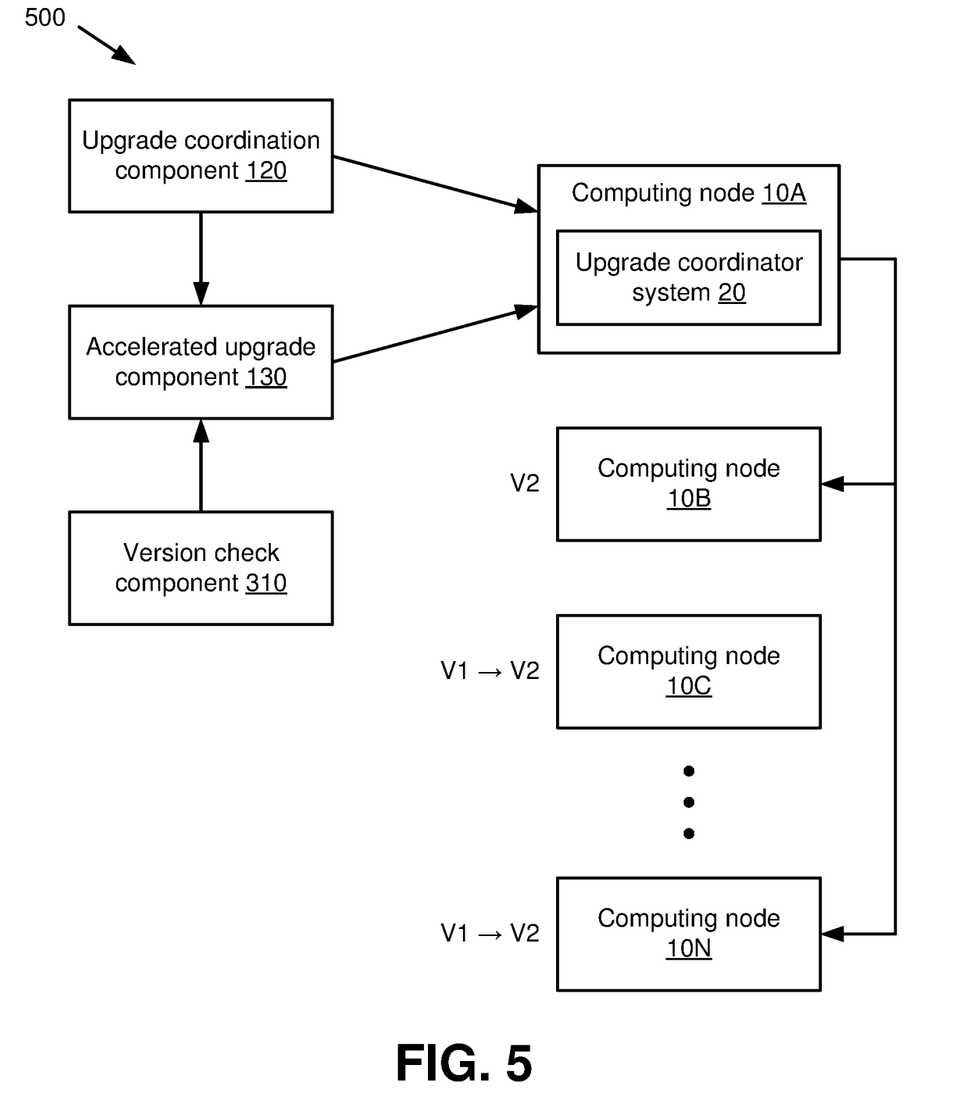

With reference next to FIG. 2 and with further reference to FIGS. 3-5, a flow diagram of a method 200 for facilitating accelerated behavior change for upgrades in distributed systems is illustrated. In an implementation, method 200 can be performed by a system that is similar to system 100, e.g., a distributed data storage system or other distributed computing system that includes respective computing nodes 10.

At 202, upgrade checks can be run on all computing nodes designated for upgrades in the distributed system. An example implementation of upgrade checks that can be performed for a set of computing nodes 10A-10N is shown by system 300 in FIG. 3. Repetitive description of like elements shown in FIG. 3 that are employed in other embodiments described herein is omitted for brevity. As shown in FIG. 3, system 300 can include a version check component 310 that can be utilized to perform the upgrade checks described at 202 of method 200.

In an implementation, the version check component 310 of system 300 can determine respective file system versions, or other software system versions, that are associated with respective computing nodes 10 that are designated for upgrade. In the example shown in FIG. 3, computing nodes 10A and 10N are running system version V1 at the time of the version check by the version check component 310, while computing node 10B is running system version V2.

In the event that the computing nodes 10 in system 300 are designated for an upgrade from version V1 to version V2, the version check component 310 can provide information relating to the respective system versions running on the computing nodes 10 to the accelerated upgrade component 130 as described above, and/or other components, such as the upgrade initialization component 110 of system 100 (not shown in FIG. 3). In response to receiving this system version information, the accelerated upgrade component 130 can select respective ones of the computing nodes 10 for which the system upgrade will proceed. Thus, in the example shown in FIG. 3, the accelerated upgrade component 130 can select the nodes not already running system version V2, e.g., nodes 10A and 10N, for the upgrade.

In an implementation, the version check component 310 can facilitate the selection of computing nodes 10 for upgrade that are not presently running the target version of the upgrade. Accordingly, in addition to computing nodes 10A and 10N in system 300 running version V1, the accelerated upgrade component 130 could also select for upgrade any computing nodes 10 in system 300 that are running system versions that are older than version V2 but are nonetheless distinct from version V 1.

Returning to method 200 as shown in FIG. 2, at 204, a first node of the distributed system, e.g., a computing node 10 selected by the version check component 310 and/or the accelerated upgrade component 130 at 202, can be upgraded to the target system version. By way of an example shown by system 400 in FIG. 4, the upgrade initialization component 110 can facilitate an upgrade of computing node 10A from version V1 to version V2. In an implementation, since no computing nodes 10 are yet running high-side version V2 at 204, the upgrade performed by the upgrade initialization component 110 at 204 can occur based on upgrade techniques as known in the art, e.g., method 200 can proceed from 204 to 206 to wait for the first computing node to reboot into the upgraded version prior to proceeding.

Once the first computing node has rebooted into the upgraded system version, method 200 can utilize features present in the upgraded version to accelerate the system upgrade for all other nodes of the distributed system that are designated for upgrade. For instance, method 200 can proceed from 206 to 208, in which a command can be sent from a supervisor running on the first computing node upgraded at 204-206 to each of the other nodes designated for upgrade, e.g., via agents running on the designated nodes. For instance, as shown by system 500 in FIG. 5, the upgrade coordination component 120 can activate an upgrade coordinator system 20 at computing node 10A. The upgrade coordinator system 20 can serve as the supervisor for sending messages to other designated computing nodes 10, e.g., the computing nodes 10 chosen based on information collected by the version check component 310 at 202. In the example shown by FIG. 5, computing nodes 10C and 10N are running low-side version V1, while computing node 10B is already running high-side version V2. Accordingly, the upgrade coordinator system 20 of computing node 10A can send commands to computing nodes 10C and 10N to initialize the upgrade procedure at those nodes.

Based on the commands sent from the supervisor of the first computing node to the other designated computing nodes in the distributed system at 208, method 200 can then conclude at 210, in which each other node designated for upgrade starts the upgrade process until the reboot step. For instance, returning to the example shown in FIG. 5, the accelerated upgrade component 130 can cause the upgrade coordinator system 20 of computing node 10A to instruct designated computing nodes 10C and 10N to perform any pre-reboot operations associated with the upgrade from version V1 to version V2. Following these operations, the upgrade coordinator system 20 of computing node 10A, or a similar upgrade coordinator system 20 at another computing node, can complete the upgrade at the respective designated computing nodes 10 by restarting the computing nodes 10 in sequence.

By performing a rolling upgrade in the manner shown by method 200, upgrade-related behavior associated with a target system version can be interleaved with that of low-side version(s) already present on a distributed system to accelerate the rolling upgrade process relative to a rolling upgrade that behaves according to the low-side version(s) only. For instance, when a supervisor system is activated on a node that has upgraded to the target system version, the supervisor system of the upgraded node can shift the order of operations associated with the rolling upgrade in a manner that accelerates the upgrade process while remaining compatible with the upgrade protocol of the low-side version(s) running on the other system nodes.

Figure 6:
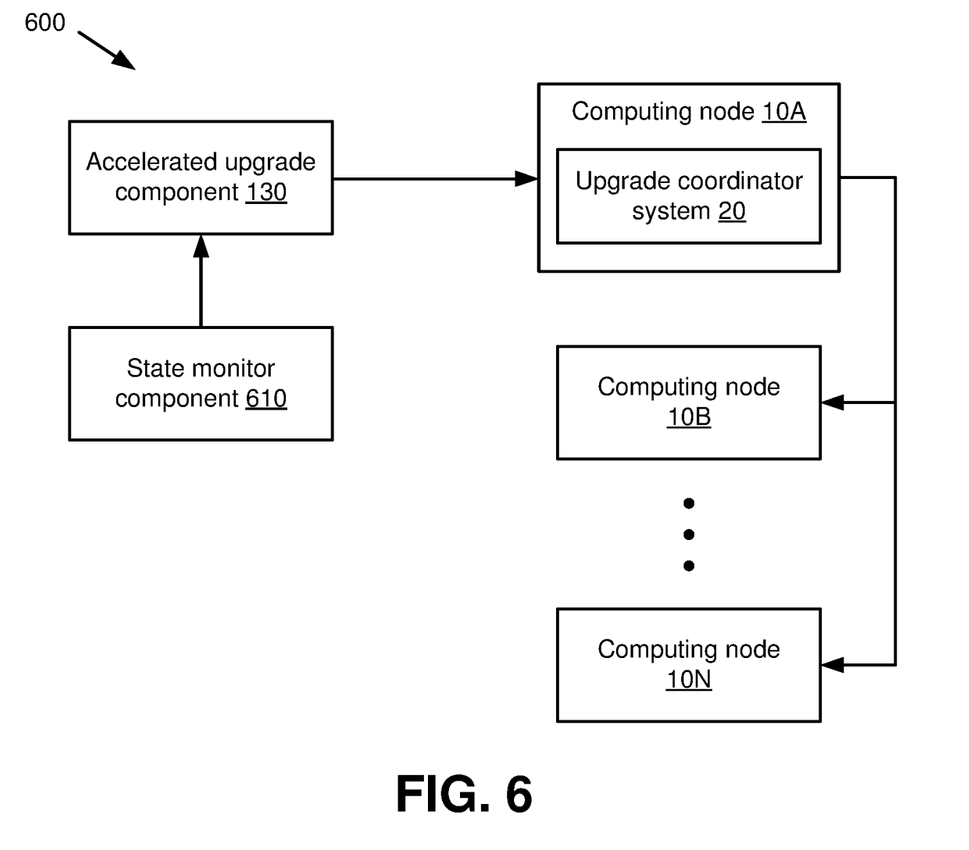
FIG. 6 is a block diagram of a system that facilitates state-aware node upgrades in a distributed computing system in accordance with various implementations described herein.

Turning next to FIG. 6, a block diagram of a system 600 that facilitates state-aware node upgrades in a distributed computing system is illustrated. Repetitive description of like elements that are employed in other embodiments described herein is omitted for brevity. As shown in FIG. 6, system 600 includes a state monitor component 610 that can track completion status of respective operations associated with a system upgrade at one or more associated computing nodes 10. Based on the completion status of a given computing node 10, the state monitor component 610 can facilitate the performance of next steps in the upgrade process, e.g., by causing the accelerated upgrade component 130 to instruct the upgrade coordinator system 20 of an upgraded computing node 10A regarding said next steps.

In an implementation, the state monitor component 610 can receive information regarding the state of a given computing node 10 to be upgraded, e.g., by the upgrade coordinator system 20 of an upgraded computing node 10A. The state monitor component 610 can then utilize this information to determine further actions to be taken with respect to the upgrade. For instance, in response to determining that a computing node 10 has performed first pre-reboot operations of a system upgrade, the state monitor component 610 can facilitate performance of second pre-reboot operations of the system upgrade that follow the first pre-reboot operations.

In another implementation, the state monitor component 610 can provide additional guidance to the upgrade coordinator system 20 of an upgraded computing node 10A. For instance, in the event that one or more operations of the upgrade process are desirably performed one at a time, e.g., due to an impact of said operations on the operation of the remainder of the upgrade process and/or the computing nodes 10B-10N themselves, the state monitor component 610 can facilitate parallelization of upgrade operations that can be parallelized while enabling sequential performance of other operations of the upgrade process that cannot be parallelized.

With reference now to FIGS. 7-10, respective stages of an example rolling upgrade that can be performed in accordance with various aspects described herein are presented in tabular format. The example rolling upgrade shown in FIGS. 7-10 is performed for a system of four nodes, indexed 1 through 4, respectively. Additionally, the rolling upgrade includes two pre-reboot operations, labeled as operations 1 and 2, a system reboot performed subsequent to the pre-reboot operations, and post-reboot operations performed subsequent to the system reboot. It is noted, however, that the rolling upgrade shown in FIGS. 7-10 is merely one example of a procedure that can be utilized, and that other procedures could also be used.

In the example shown in FIGS. 7-10, it is assumed that each node is running a low-side version prior to the upgrade, i.e., none of nodes 1 through 4 have been upgraded to a newer version prior to the depicted procedure. Accordingly, as shown by diagram 700 in FIG. 7, the example rolling upgrade can begin by fully upgrading a single node, here node 1, via all of the steps of the upgrade process, including the reboot and post-reboot operations shown in diagram 700. Because none of the nodes depicted in diagram 700 have been upgraded prior to the events shown in diagram 700, the upgrade can proceed as shown in diagram 700 regardless of the node on which the coordinator for the upgrade is active.

Figure 7:
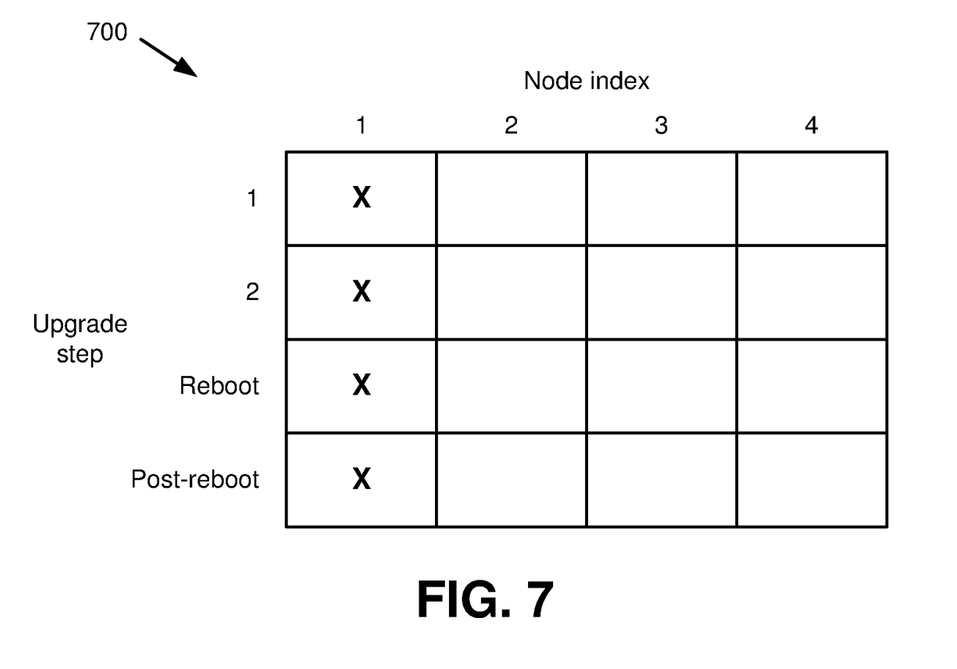
FIGS. 7-10 are diagrams depicting respective stages of an example rolling upgrade that can be performed in accordance with various implementations described herein.

As a result of the actions shown in diagram 700, node 1 is rebooted into the high-side version of the upgrade. As a result, when the coordinator for the upgrade next becomes active on node 1, node 1 can leverage the features of the upgraded version to accelerate the upgrade with respect to the remaining nodes, e.g., as shown by diagram 800 in FIG. 8. More particularly, instead of running each upgrade step on a single node at a time as shown by diagram 700, the coordinator running on node 1 as shown by diagram 800 can cause each of the other nodes to run pre-reboot steps 1 and 2 concurrently.

Figure 8:
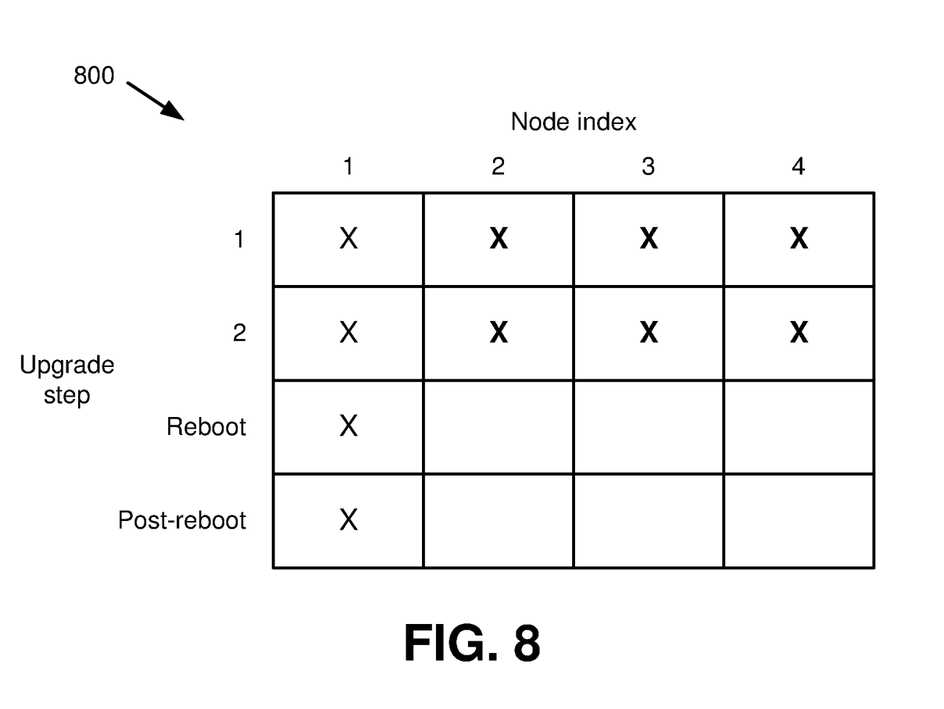
Figure 9:
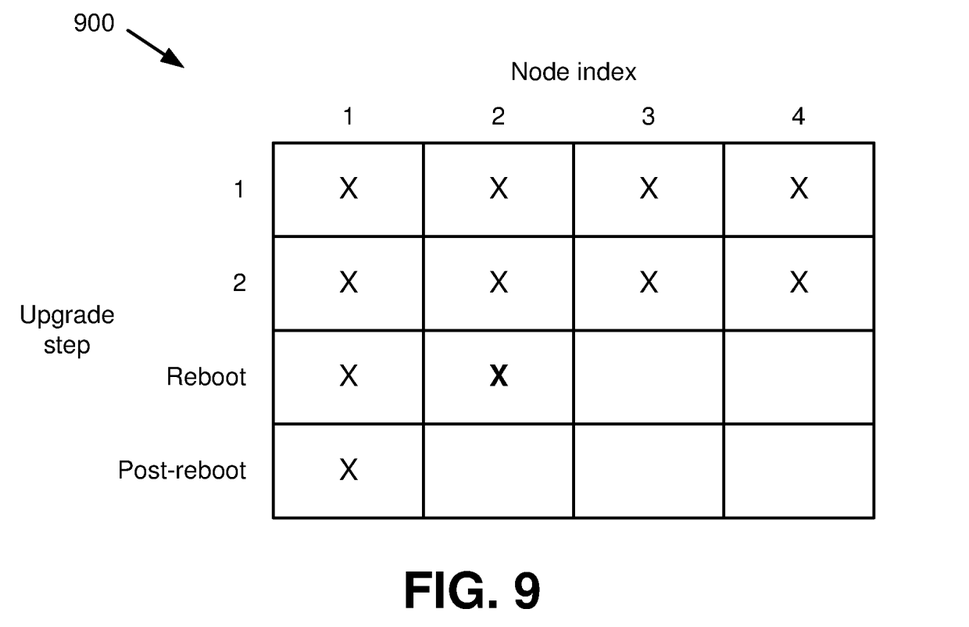
Figure 10:
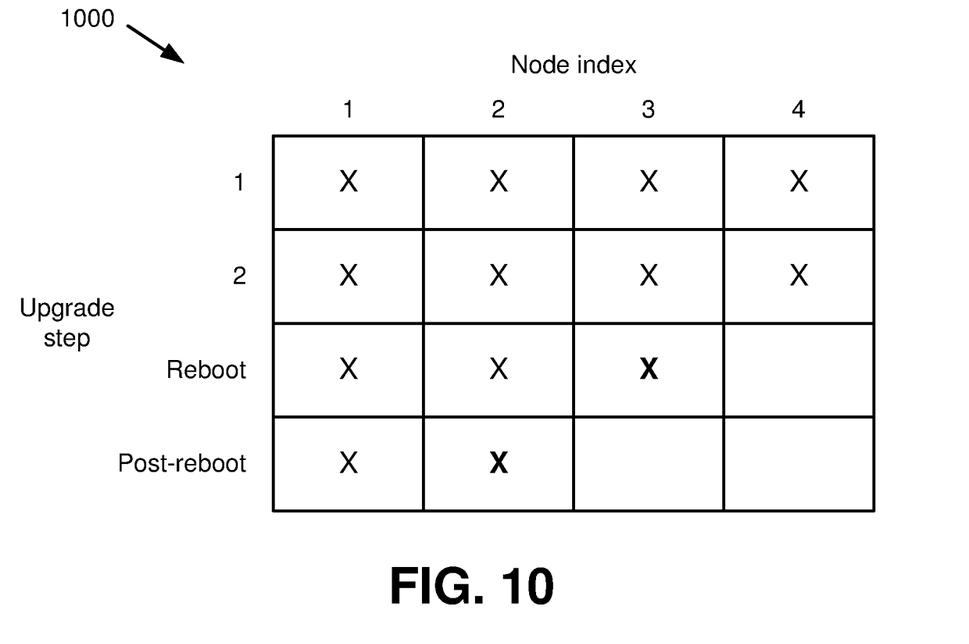

Following nodes 2 through 4 running the pre-reboot steps as shown by diagram 800, the coordinator running on node 1 can continue the upgrade process as shown by diagram 900 in FIG. 9 by instructing one of the nodes that have completed the pre-reboot steps, here node 2, to perform the system reboot associated with the upgrade. It is noted that while the pre-reboot steps can be performed concurrently as shown by diagram 800, system reboots can still be configured to be performed one at a time, e.g., to maintain continuity of access to the data stored by the system. However, as further shown by diagram 1000 in FIG. 10, the coordinator running on node 1 can instruct another node, here node 3, to perform the system reboot associated with the upgrade in parallel with node 2 performing the post-reboot operations associated with the upgrade. In an implementation, parallel system reboots and post-reboot operations as shown by diagram 1000 can be performed for each remaining node in the system, either by the coordinator running on node 1 or a similar coordinator running on another node of the system that has already been upgraded to the high-side version.

Figure 11:
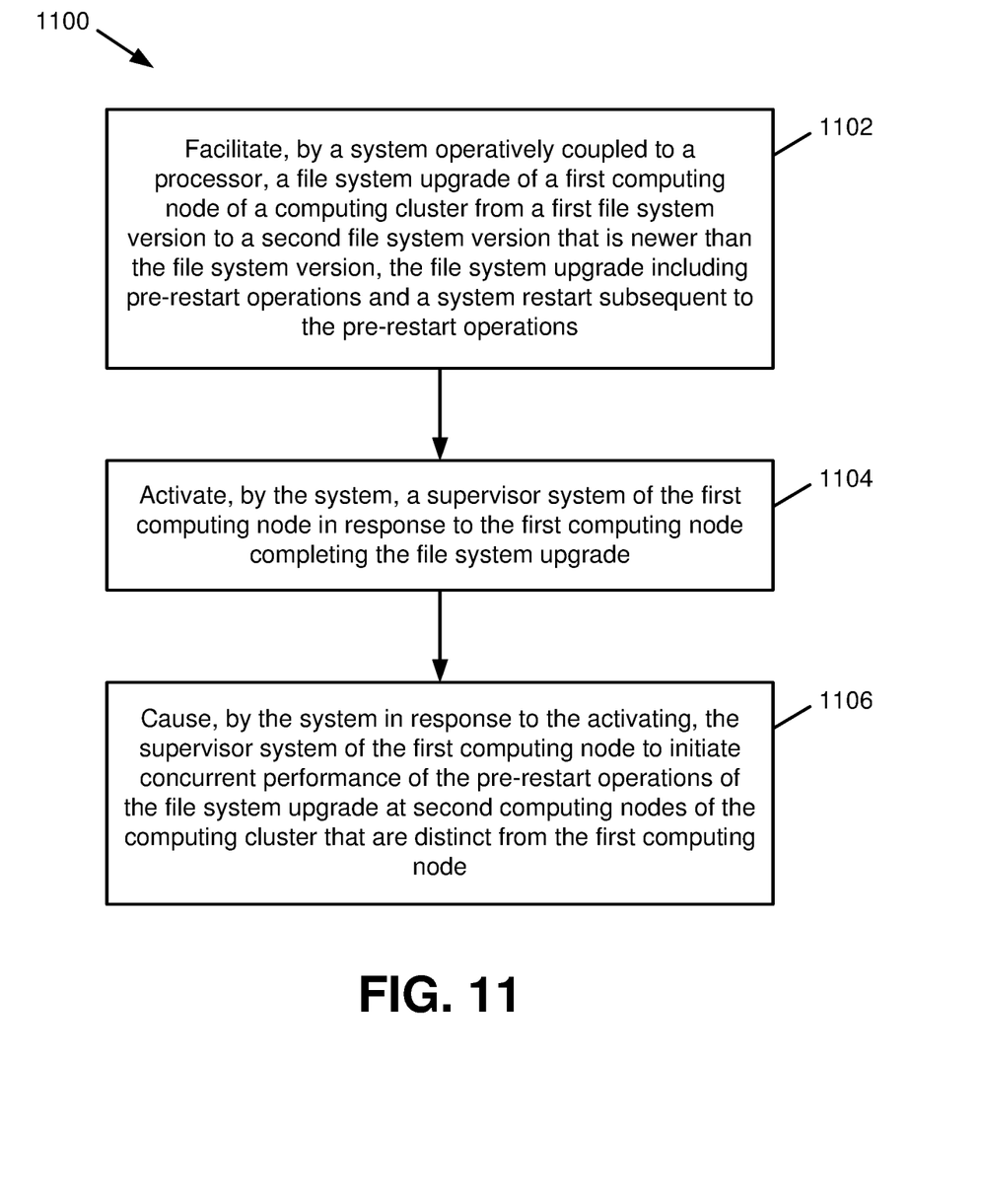
FIG. 11 is a flow diagram of a method that facilitates accelerated behavior change for upgrades in distributed systems in accordance with various implementations described herein.

Referring next to FIG. 11, a flow diagram of a method 1100 that facilitates accelerated behavior change for upgrades in distributed systems in accordance with various implementations described herein is illustrated. At 1102, a system operatively coupled to a processor can facilitate (e.g., by an upgrade initialization component 110) a file system upgrade of a first computing node (e.g., computing node 10A) of a computing cluster from a first file system version to a second file system that is newer than the first file system version. The file system upgrade can include pre-restart operations and a system restart performed subsequent to the pre-restart operations, e.g., as shown by FIGS. 7-10.

At 1104, the system can activate (e.g., by an upgrade coordination component 120) a supervisor system (e.g., an upgrade coordinator system 20) of the first computing node in response to the first computing node completing the file system upgrade at 1102.

At 1106, in response to activating the supervisor system of the first computing node at 1104, the system can cause (e.g., by an accelerated upgrade component 130) the supervisor system of the first computing node to initiate concurrent performance of the pre-restart operations of the file system upgrade, e.g., as shown by diagram 800, at second computing nodes (e.g., computing nodes 10B-10N) of the computing cluster that are distinct from the first computing node.

FIGS. 2 and 11 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 12:
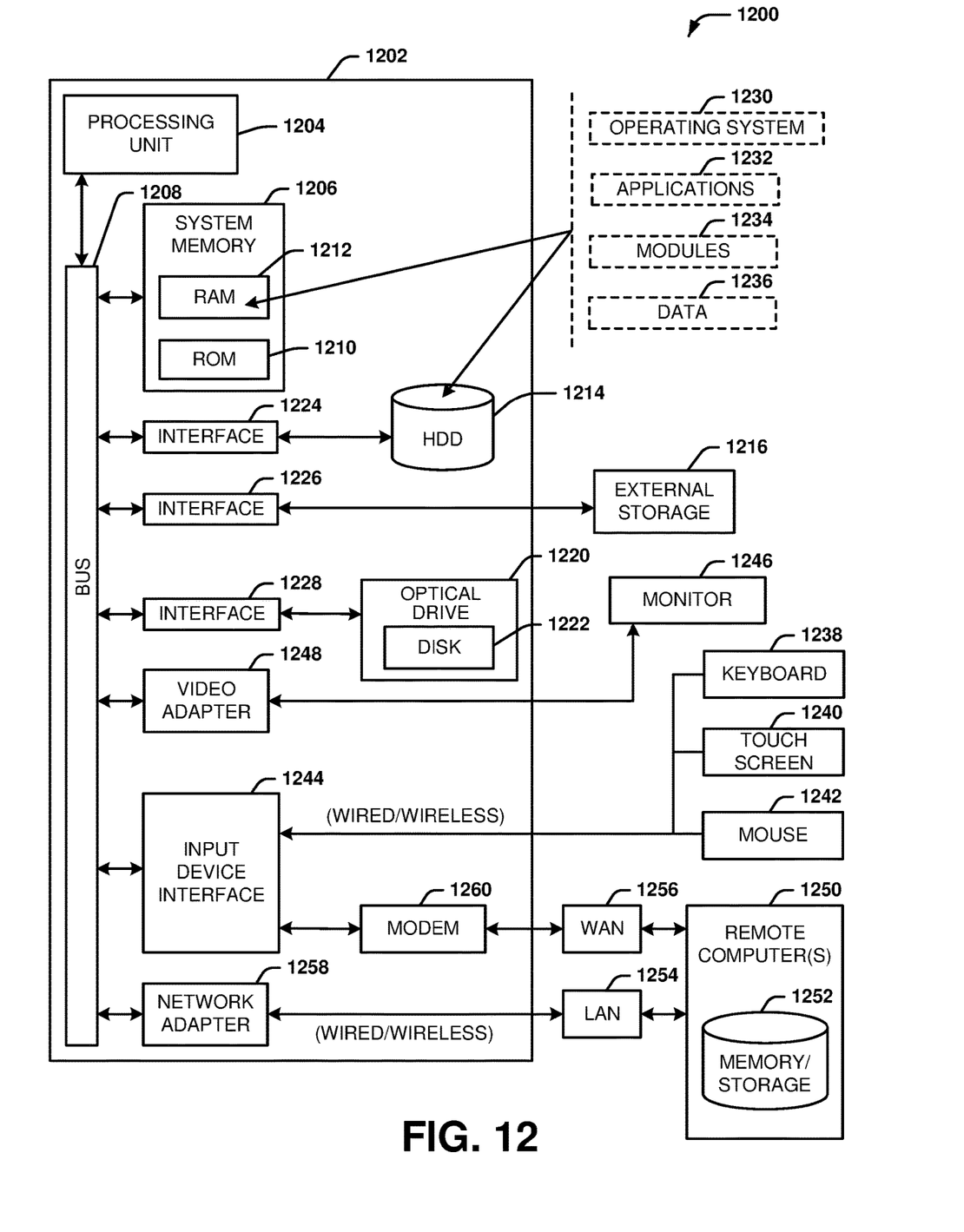
FIG. 12 is a diagram of an example computing environment in which various embodiments described herein can function.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD), a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
a memory that stores executable components; and
a processor that executes the executable components stored in the memory, wherein the executable components comprise:
an upgrade initialization component that causes a first computing node in the data storage system to perform a file system upgrade from a first file system version to a second file system version that is newer than the first file system version, wherein the file system upgrade comprises pre-reboot operations and a system reboot performed subsequent to the pre-reboot operations;
an upgrade coordination component that activates an upgrade coordinator system of the first computing node in response to the first computing node completing the file system upgrade; and
an accelerated upgrade component that, in response to the upgrade coordination component activating the upgrade coordinator system of the first computing node, causes the upgrade coordinator system of the first computing node to instruct second computing nodes of the data storage system, distinct from the first computing node, to perform the pre-reboot operations of the file system upgrade concurrently.

2. The data storage system of claim 1, wherein the file system upgrade further comprises post-reboot operations performed subsequent to the system reboot.

3. The data storage system of claim 2, wherein the accelerated upgrade component further causes the upgrade coordinator system of the first computing node to instruct a third computing node, of the second computing nodes, to perform the system reboot in response to the third computing node completing the pre-reboot operations.

4. The data storage system of claim 3, wherein the accelerated upgrade component further causes the upgrade coordinator system of the first computing node to instruct a fourth computing node, of the second computing nodes, to perform the system reboot in response to the third computing node completing the system reboot and starting the post-reboot operations.

5. The data storage system of claim 1, wherein the executable components further comprise:
a version check component that determines respective file system versions associated with respective computing nodes, comprising the second computing nodes, of the data storage system.

6. The data storage system of claim 5, wherein the accelerated upgrade component selects, as the second computing nodes, respective ones of the respective computing nodes that are associated with a file system version selected from a group of file system versions comprising the first file system version and a third file system version that is distinct from the first file system version and older than the second file system version.

7. The data storage system of claim 1, wherein the pre-reboot operations of the file system upgrade comprise first pre-reboot operations and second pre-reboot operations that are distinct from the first pre-reboot operations, and wherein the accelerated upgrade component causes the upgrade coordinator system of the first computing node to instruct respective ones of the second computing nodes to perform the second pre-reboot operations of the file system upgrade in response to the respective ones of the second computing nodes completing the first pre-reboot operations.

8. The data storage system of claim 7, wherein the executable components further comprise:
a state monitor component that tracks a completion status of the pre-reboot operations at a computing node of the second computing nodes, wherein the accelerated upgrade component causes the upgrade coordinator system of the first computing node to instruct the computing node of the second computing nodes to perform the second pre-reboot operations of the file system upgrade in response to the state monitor component indicating that the computing node of the second computing nodes has completed the first pre-reboot operations.

9. A method, comprising:
facilitating, by a system operatively coupled to a processor, a file system upgrade of a first computing node of a computing cluster from a first file system version to a second file system version that is newer than the first file system version, wherein the file system upgrade comprises pre-restart operations and a system restart performed subsequent to the pre-restart operations;
activating, by the system, a supervisor system of the first computing node in response to the first computing node completing the file system upgrade; and
causing, by the system in response to the activating, the supervisor system of the first computing node to initiate concurrent performance of the pre-restart operations of the file system upgrade at second computing nodes of the computing cluster, distinct from the first computing node.

10. The method of claim 9, wherein the file system upgrade further comprises post-restart operations performed subsequent to the system restart.

11. The method of claim 10, further comprising:
causing, by the system, the supervisor system of the first computing node to initialize the system restart at a third computing node of the second computing nodes in response to the third computing node completing the pre-restart operations.

12. The method of claim 11, further comprising:
causing, by the system, the supervisor system of the first computing node to initialize the system restart at a fourth computing node of the second computing nodes in response to the third computing node completing the system restart and starting the post-restart operations.

13. The method of claim 9, further comprising:
determining, by the system, respective file system versions associated with respective computing nodes, comprising the second computing nodes, of the computing cluster.

14. The method of claim 13, further comprising:
selecting, by the system as the second computing nodes, respective ones of the respective computing nodes that are associated with a file system version selected from a group of file system versions comprising the first file system version and a third file system version that is distinct from the first file system version and older than the second file system version.

15. The method of claim 9, wherein the pre-restart operations of the file system upgrade comprise first pre-restart operations and second pre-restart operations that are distinct from the first pre-restart operations, and wherein the method further comprises:
causing, by the system, the supervisor system of the first computing node to initialize the second pre-restart operations of the file system upgrade at respective ones of the second computing nodes in response to the respective ones of the second computing nodes completing the first pre-restart operations.

16. A non-transitory machine-readable medium comprising computer executable instructions that, when executed by a processor of a data storage system, facilitate performance of operations, the operations comprising:
facilitating a file system update for a first computing node of a computing system from a first file system version to a second file system version that is newer than the first file system version, wherein the file system update comprises pre-reboot operations and a reboot operation performed subsequent to the pre-reboot operations;
activating a coordinator system of the first computing node in response to the first computing node completing the file system update; and
in response to the activating, causing the coordinator system of the first computing node to initiate concurrent performance of the pre-reboot operations of the file system update at second computing nodes of the computing system that are distinct from the first computing node.

17. The non-transitory machine-readable medium of claim 16, wherein the file system update further comprises post-reboot operations performed subsequent to the reboot operation.

18. The non-transitory machine-readable medium of claim 17, wherein the operations further comprise:
   causing the coordinator system of the first computing node to instruct a third computing node of the second computing nodes to perform the reboot operation in response to the third computing node completing the pre-reboot operations.

19. The non-transitory machine-readable medium of claim 18, wherein the operations further comprise:
   causing the coordinator system of the first computing node to instruct a fourth computing node of the second computing nodes to perform the reboot operation in response to the third computing node completing the reboot operation and starting performance of the post-reboot operations.

20. The non-transitory machine-readable medium of claim 16, wherein the pre-reboot operations of the file system update comprise first pre-reboot operations and second pre-reboot operations that are distinct from the first pre-reboot operations, and wherein the operations further comprise:
   causing the coordinator system of the first computing node to initiate performance of the second pre-reboot operations of the file system update at respective ones of the second computing nodes in response to the respective ones of the second computing nodes completing the first pre-reboot operations.

* * * * *